United States Patent [19]

Rizk et al.

[11] Patent Number: 4,475,165
[45] Date of Patent: Oct. 2, 1984

[54] METHOD OF DATA ENTRY AND EXECUTION OF A TWO VARIABLE CALCULATOR FUNCTION IN THE SAME MANNER AND ENTRY FORMAT AS A SINGLE VARIABLE FUNCTION

[75] Inventors: Samir W. Rizk; Stoddard S. Millwright, both of Lubbock, Tex.

[73] Assignee: Texas Instruments Incorporated, Dallas, Tex.

[21] Appl. No.: 280,649

[22] Filed: Jul. 6, 1981

[51] Int. Cl.³ .............................................. G06F 7/48
[52] U.S. Cl. .................................................... 364/709
[58] Field of Search ............... 364/705, 706, 709, 710, 364/715

[56] References Cited

U.S. PATENT DOCUMENTS 3,762,637 10/1973 Hernandez .......................... 364/709
4,149,261 4/1979 Harigaya et al. ................ 364/709 X
4,208,720 6/1980 Harrison ............................. 364/709
4,302,816 11/1981 Yamamoto ........................... 364/709

OTHER PUBLICATIONS

Throw Away Your Slide Rule, Tooling and Production, vol. 38, No. 10, Jan. 1973, pp. 40-41.

Primary Examiner—Charles E. Atkinson
Attorney, Agent, or Firm—R. E. Grossman; Leo N. Heiting; Melvin Sharp

[57] ABSTRACT

A data processing apparatus includes a novel method of entering the data for a function which requires two integral operands. First and second preselected sets of the digits of the current output numerical value are interpreted as the first and second integral operands. In the preferred embodiment a predetermined number of the least significant whole number digits is interpreted as the first operand and the predetermined number of the most significant fractional digits is the second operand. This data entry method reduces the amount of memory required to store the operands and to execute the function. This data entry method also enables entry and execution of these two variable functions in the same mathematical hierarchy as single operand functions. In the case of the preferred embodiment, in which this data entry method is used for calculating permutations and combinations, this is the preferred and mathematically correct method of executing these functions.

6 Claims, 3 Drawing Figures

METHOD OF DATA ENTRY AND EXECUTION OF A TWO VARIABLE CALCULATOR FUNCTION IN THE SAME MANNER AND ENTRY FORMAT AS A SINGLE VARIABLE FUNCTION

BACKGROUND OF THE INVENTION

The present invention relates to data processing apparatuses which include preprogrammed functions, and specifically preprogrammed functions which require two integral operands. This functional capability is most often found in the so called "scientific" calculators. These calculators generally include a wide variety of functions in addition to the basic rour arithmetic operational functions of addition, substraction, multiplication and division. These machines typically include a keyboard for entering information and operational commands into the machine and a visual display for communicating an indication of the results to the operator. These machines often include preprogrammed functions which require two integral operands such as the calculation of the number of permutations of n things taken r at a time and the number of combinations of n things taken r at a time.

In the prior art the two integral operands required for these functions are entered in the normal manner of operand entry. That is, the first operand is entered, the functional command is entered and then the second operand is entered. This entry method, which corresponds generally to the manner in which an algebraic expression is entered, is termed the algebraic entry method. According to this technique two pending operand memories are required for entering these two integral operand functions. This system also requires that these integral operand functions occupy a place within the mathematical hierarchy of operation along with the other two operand functions such as addition, subtraction, multiplication and division. Because the mathematical hierarchy properly assignable to such functions as permutation and combination are more akin to those assigned to unitary operations such as the trigonometric functions or logarithmic functions, this prior entry method sometimes leads to less than satisfactory performance of the desired function.

SUMMARY OF THE INVENTION

It is an object of the present invention to provide a novel method of entering data for functions which require two integral operands. This invention is most applicable to scientific calculators which provide one or more preprogrammed two integral operand functions.

In accordance with one embodiment of the present invention, the two integral operands are entered as a single variable, the first integral operand being entered prior to entry of a decimal point and the second integral operand being entered after the entry of the decimal point.

According to another embodiment of the present invention the integral operands are determined by selecting predetermined digits from the current output data which is generally stored in an output indicator memory. This current output data may be entered data or previously calculated data. In this preferred embodiment a predetermined number of the least significant whole number digits may be interpreted as the first operand and the predetermined number of the most significant fractional digits is interpreted as the second operand. In the particular embodiment described in the present appliction, this predetermined number of digits is three.

It is a further object of the present invention to disclose a data entry method as described above which is usable in combination with the functions of calculating combinations and calculating permutations.

BRIEF DESCRIPTION OF THE DRAWINGS

The above and other objects and aspects of the present invention will become clear from the following description taken in conjunction with the drawings, in which.

DETAILED DESCRIPTION OF THE PREFERRED EMBODIMENT

Figure 1:
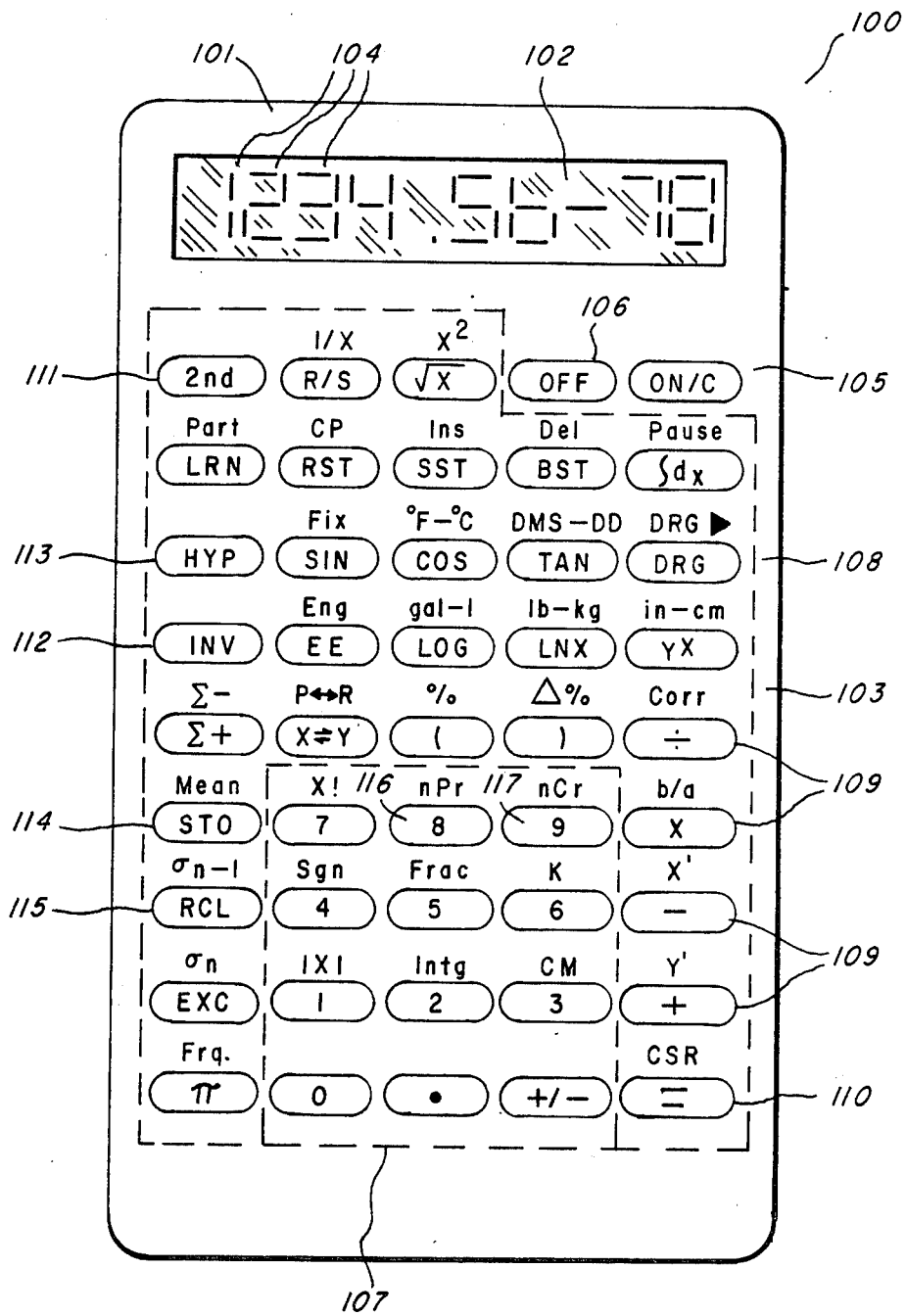
FIG. 1 illustrates the front panel of a data processing apparatus in accordance with the present invention.

FIG. 1 illustrates the front panel of the case of a data processing apparatus which is the subject of the present application. As illustrated this data processing apparatus is conventionally known as a scientific calculator. The name scientific calculator applies generally to hand-held or desk top machines which perform mathematical operations from inputs from a keyboard and which supply a visual display which is the output of the results.

FIG. 1 shows the front panel of data processing apparatus 100 which illustrates substantially all of the machine/user interface components. Data processing apparatus 100 includes case 101, display 102 and keyboard 103.

Display 102 includes a plurality of seven segment digits 104. The digits 104 are primarily employed to provide a visual output of the numerical results calculated by the machine. In addition, a data processing apparatus of this type typically also generates an output indication of input data as it is input and may also indicate the operational state of the machine. Such indications commonly include whether one of the function control keys has been depressed, the current angular calculation mode of the machine and may also include some indication of an error condition for an unpermitted input sequence or operation.

User input of data and operational commands to the data processing apparatus is made by a keyboard 103. Keyboard 103 is made up of a plurality of momentary contact key switches, each of these key switches having a predefined function. On/Clear key 105 is employed to turn the data processing apparatus on if the apparatus is turned off. If the apparatus is turned on, On/Clearkey 105 functions to clear the number displayed by display 102 in order to enable input of new numerical data or in order to enable input of corrected numerical data in the case that the operator makes a mistaken entry. Off key 106 is employed to turn data processing apparatus 100 off.

Keyboard 103 includes a plurality of numerical input keys 107. These numerical input keys 107 include the decimal digits 0 to 9, a decimal point and a sign control key. Together these 12 keys are employed to enter numerical data into the machine to provide the required operands for the mathematical functions to be performed.

Keyboard 103 further includes a plurality of operational/functional command keys 108. Operational/functional command keys 108 enable the user to input to the machine commands for performing the desired operations and functions. Operational/functional command keys 108 include the basic functions of addition, subtraction, multiplication and division indicated by the basic function keys 109. Operation and function command keys 108 also includes an equal sign key 110 which enables completion of an entered algebraic expression, thereby commanding the machine to compute the desired result from the entered data and the entered commands. Typically, data processing apparatus 100 includes a plurality of other operational/functional command keys 108 such as illustrated for performing a variety of other types of calculations.

Operational/functional command keys 108 may include a plurality of data processing control operational command keys. These keys are employed to change the meaning of depression of particular keys to command operations differing from the primary operations. These data processing control command keys may include second key 111, inverse key 112, and hyperbolic key 113. The second key 111 is employed to designate a secondary function for at least some of the other keys of keyboard 103. As illustrated in FIG. 1, a significant number of the keys of keyboard 103 have a primary function indicated on the key and a secondary function indicated on the display panel above the key. The second key 111 is employed to designate the secondary function for the next depressed key. Inverse key 112 is employed to change the next depressed operational/functional key 108 to the inverse of the primary operation. As an example, the inverse key 112 could change the meaning of the depression of a logarithm key from the calculation of a logarithm to the calculation of an exponential. The inverse key 112 might also be employed in conjunction with the trigonometric function keys to input a command such as calculation of the arc sine, arc cosine or arc tangent. Generally the inverse key 112 can properly be used to redefine the operation of fewer of the keys 108 than the second key 111. Hyperbolic key 113 may also be employed as a data processing control command key. Use of hyperbolic key 113 in conjunction with the ordinary circular trigonometric functions of sine, cosine and tangent would change the meaning of these commands to the calculation of the hyperbolic sine, hyperbolic cosine and hyperbolic tangent respectively. Generally the operation of even fewer keys can be redefined by employing hyperbolic key 113 than by employing inverse key 112.

A further subset of command keys 108 control the storage and recall of data from the user accessible memories. Store key 114 and recall key 115 are typical of the type of input commands employed for this purpose. In a data processing apparatus having only a single user accessible memory, depression of the store key 114 would store data corresponding to the currently displayed data in the user accessible memory. In such a machine, depression of the recall key 115 would recall the data stored in the memory and display it via display 102. In the case of a data processing apparatus having a plurality of user accessible memories a memory designation must follow each memory store and recall operation. In the data processing apparatus 100 illustrated in FIG. 1, designation of the particular user accessible memory desired is via numerical keys 107. Thus, by depressing the store key 114 and the numerical key 5 the currently displayed data would be stored in the memory designated by 5. Similarly, depression of recall key 115 followed by depression of numerical key 3 would result in the recall and display of the data stored in the memory designated 3. It should be understood that other data processing apparatuses may employ a plurality of alphabetic keys (such as A, B, C, D, etc.) to designate the particular user accessible memory addressed. The present invention is equally applicable to the case in which alphabetic memory designator keys are employed.

FIG. 1 illustrates two dual function keys 116 and 117 which are employed in the present invention. Key 116 has a primary function of entering the data digit 8 and secondary function of entering the operational command to calculate the number of permutations of n things taken r at a time. Key 117 has the primary function of entering the data digit 9 and the secondary function of entering the operational commands to calculate the number of combinations of n things taken r at a time. These secondary functions of keys 116 and 117 are enabled in the manner described above in relation to the operation of the second key 111. In order to enter the operational command for calculating permutations the user would depress second key 111, thereby redefining the meaning of the next following key depression, and then depress key 116. Similarly, in order to enter the operational command for calculating combinations the user would depress second key 111 and key 117.

Figure 2:
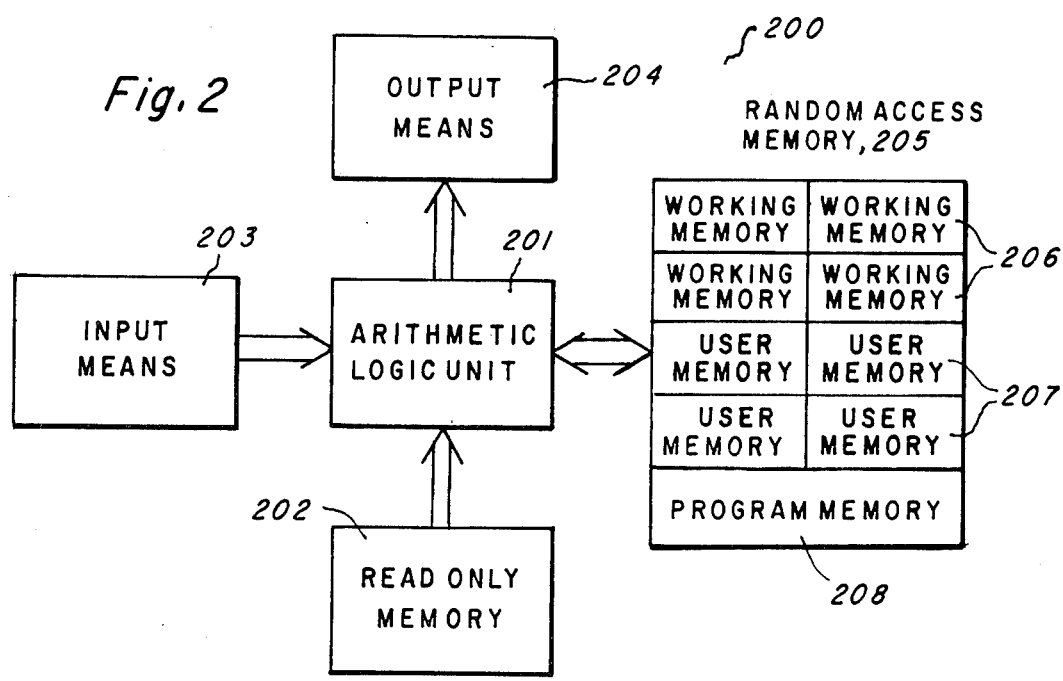
FIG. 2 illustrates a block diagram of the circuitry employed in a data processing apparatus in accordance with the present invention.

FIG. 2 illustrates a block diagram of data processing apparatus 200 which may be used to embody the present invention. Central to the functioning of data processing apparatus 200 is arithmetic logic unit 201. Arithmetic logic unit 201 performs all of the computation and control functions necessary for the operation of data processing apparatus 200. The operation of arithmetic logic unit 201 is controlled by a read only memory 202 in conjunction with data and command inputs from input means 203. Input means 203 is typically embodied by keyboard 103 illustrated in FIG. 1. Read only memory 202 preferably includes a plurality of instruction words which are sequentially applied to arithmetic logic unit 201 thereby causing it to perform desired operations. These desired operations typically include so called "overhead" functions. These overhead functions would typically include periodically checking the condition of input means 203 to determine whether an input signal is generated, decoding any received input signal to determine the next operation to be performed, and generation of signals for output via output means 204. Output means 204 is typically embodied by display 102 illustrated in FIG. 1. The instruction words stored in read only memory 202 are generally in machine code, that is each instruction word commands arithmetic logic unit 201 to perform a single simple operation. Groups of instruction words are read out of read only memory 202 in accordance with the particular inputs received from input means 203 to cause arithmetic logic unit 201 to perform each of the functions of the command keys 108 illustrated in FIG. 1. In performing these commanded functions arithmetic logic unit 201 sends data to random access memory 205 for storage therein and retrieves data previously stored in random access memory 205 for operation thereon. In accordance with the groups of instruction words stored in read only memory 202 arithmetic logic unit 201 addresses various portions of random access memory 205. Thus random access memory 205 is partitioned into several types of memory units in accordance with the instructions of read only memory 202.

Random access memory 205 includes a plurality of working memories 206 which are employed to store the pending operands applied to arithmetic logic unit 201, an indication of entered but unperformed commands and various calculated intermediate values. Working memories 206 may also be used as address pointers to store the address of particular instruction words in read only memory 202. This use would typically include the storage of the address of a return point in read only memory 202 during execution of a subroutine. Typically one of the working memories 206 is employed to store the data which is output via output means 204. This is accomplished by read only memory 202 commanding arithmetic logic unit 201 to read out the data stored in this particular working memory and to apply appropriate signals to output means 204 to cause output means 204 to generate an indication of this data.

In the data processing apparatus 200 of the present invention random access memory 205 also includes at least one user accessible memory 207. As explained above in conjunction with the description of the operation of store key 114 and recall 115, upon entry of appropriate inputs from input means 203, read-only memory 202 causes arithmetic logic unit 201 to transfer data from the working memory 206 associated with the output and a selected one of the user accessible memories 207.

Random access memory 205 may also include a program memory 208. Program memory 208 is employed for storing a set of a plurality of input commands from input means 203. This set of input commands is stored in program memory 208 by the user by selection of appropriate input commands from input means 203 in order to enable the data processing apparatus 200 to perform a user selected series of commands. Typically the program steps stored in program memory 208 each correspond to one of the command keys 108 which generate the input signals from input means 203. Thus each of these program steps in program memory 208 selects a group of instruction words in read only memory 202 for applying the desired instructions to arithmetic logic unit 201 in order to perform the selected function.

By adopting this form of construction, data processing apparatus 200 becomes in effect a miniature programmed digital computer. By proper selection of the instruction words permanently stored in read only memory 202 during the manufacture of the data processing apparatus 200, the manufacturer may provide a selected group of preprogrammed functions which are enabled by proper inputs from input means 203. Because a typical data processing apparatus 200 has arithmetic logic unit 201, read only memory 202 and random access 205 embodied in a single integrated circuit chip, the instruction words stored in read only memory 202 may be changed by changing a single manufacturing step in the integrated circuit construction. Thus an entirely new data processing apparatus 200 may be constructed which performs an entirely new set of functions without the necessity for completely redesigning the generalized computer like structure of the apparatus.

The operation of the data processing apparatus of the present invention will now be described in conjunction with the flow chart illustrated in FIG. 3. It is understood that this flow chart illustrates the general steps in the operation of data processing apparatus 200 and are not intended to illustrate the exact programs stored in read only memory 202. It should be understood that one skilled in the art of design of such data processing apparatuses would be able to provide the proper exact program to be stored in read-only memory 202 to perform the functions illustrated in the flow chart of FIG. 3 once selection is made of the particular arithmetic logic unit 201 to be employed with its particular instruction set.

Figure 3:
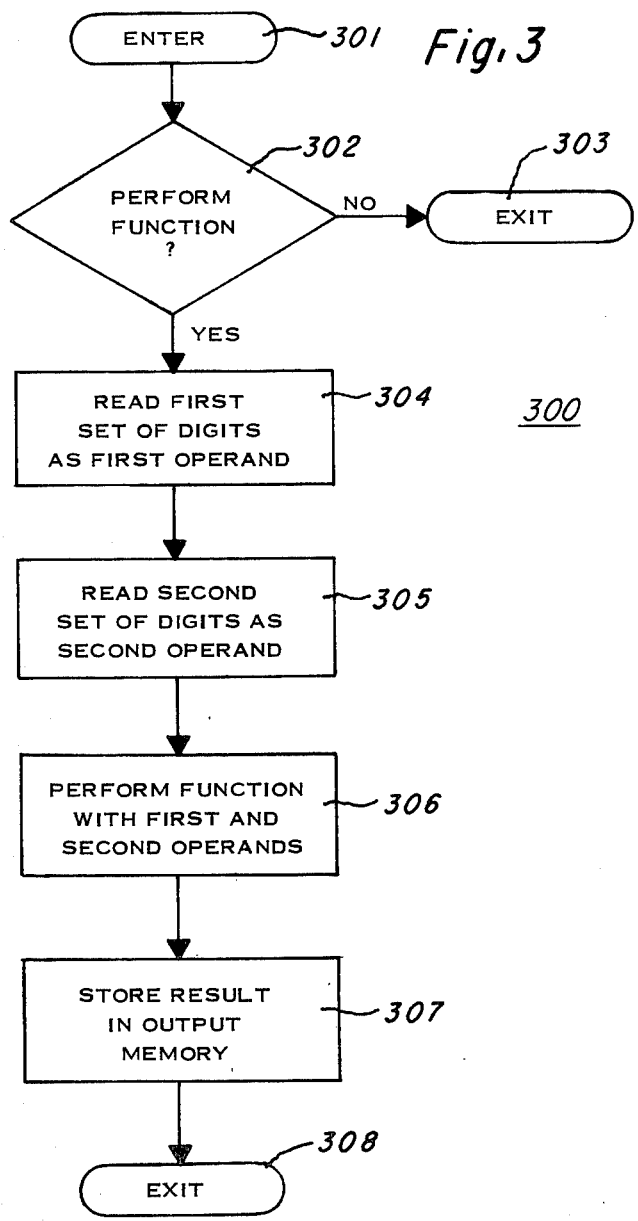
FIG. 3 illustrates a flow chart of the operation of a data processing apparatus in accordance with the present invention.

FIG. 3 illustrates program 300 which sets for the steps of operation of data processing apparatus 200 in accordance with the present invention. Program 300 is entered via processing block 301. The program tests to determine whether a two integral operand function is to be performed (decision block 302). If no such operation is to be performed, then program 300 is exited (processing block 303). If one of these two integral operand functions is to be performed then the first operand is generated by reading out a preselected set of the digits stored in the working memory 206 which controls the data output via output means 204 (processing block 304). Next the second operand is generated by reading out the second set of digits of the working memory 206 which controls the output data (processing block 305). Next the function to be executed is performed using the previously determined first and second operands from processing blocks 304 and 305 respectively (processing block 306). Next the result of this operation is stored in the working memory 206 which controls the output data (processing block 307). Lastly, the program is exited (processing block 308).

A practical example of the method of entering data in accordance with the present invention is given below. Suppose, for example it was desired to calculate the permutation of six things taken two at a time. The functional commands and data entry for causing the calculator illustrated in FIG. 1 to perform this function are as follows. Firstly, the second key 111 is depressed. Next key 116 is depressed. Taken together these two inputs into data processing apparatus 100 enters the operational command for calculating the number of permutations of n things taken r at a time. However, the data necessary for enabling this function has not yet been entered. This data entry is accomplished by depressing the following data entry keys 6, the decimal point key 0, 0 and 2. Note the entry of the two leading zero's prior to the entry of the second operand 2. The entry of these two leading zero's is required because of the manner in which data processing apparatus 100 determines the operands from this single data entry. The first operand is determined from the contents of the hundreds digit, the tens digits, and the units digit. The data processing apparatus treats these three digits in isolation as a three digit integer for determining the first operand of the function (in this case the n of the n things in the permutation calculation). Because the data processing apparatus automatically zero's the hundreds digit and the tens digit upon data entry, the contents of these three digits after the above described entry is 006. Thus the data processing apparatus recognizes the first operand as the integer 6. Similarly, the data processing apparatus derives the second operand from the contents of the tenths digit, the hundredths digit, and the thousandths digit. The data processing apparatus treats these three digits as if they were a three digit integer in determining the second operand. In the case of the above described input, these three digits are 002 and thus the second operand is recognized as the integer 2. If the leading zero's were not entered (that is if the data entry were 6, the decimal point and 2) then the program would recognize the tenths digit, the hundredths digit and the thousandths digit as the integer 200 rather than the intended integer 2. Lastly, the algebraic expression would be completed by depression of the equal sign key 110. Upon entry of the equal sign key program 300 previously described in conjunction with FIG. 3 is executed and the answer 15 is displayed via display 102.

The selection of the two sets of three digits described above is a design choice. Note that calculators of this type are ordinarily limited and the largest number they can store and display by the number of digits in the exponent field, generally two digits. Thus machines of this type are ordinarily limited to displaying numbers less than $10^{99}$. Permutations are calculated according to the known formula $nPr=n!/(n-r)!$. Similarly the number of combinations are calculated according to a known formula $nCr=n!/((n-r)!\times r!)$. It is readily understood that the factorial function used in these calculations generates extremely large numbers. For example, 70! is greater than $10^{99}$. Thus many two digit permutation and combination functions would generate results which are greater than the usual capacity of a data processing apparatus which as the ones described here to store and display. However, there will be a considerable number of permutation and combination calculations with three digit operands which still remain within the storage and display capacity of these data processing apparatuses. Thus the selection of three digits for the operand fields is a compromise between unduly restricting the capability of the data processing apparatus to receive entry of operands for which it can calculate a result and restricting the size of the operands to that size which may always be calculated.

It should be understood that the selection of the particular set of data digits for generating of the first and second operands described above is a design choice. The design choice described above is based upon two factors. Firstly, entry of a decimal point between the first and second operands serves to separate these numbers in the operator's mind and serves to prevent operator confusion in using this data entry format. Secondly, data processing apparatuses of this type often include the option to operate in either a decimal degree mode or a degree and minute mode. In such machines there is already within the read only memory 202 the programs required for separating the least significant of the whole number digits from the most significant of the fractional digits for calculation in the degrees and minutes mode. Therefore, this program for separating these separate sets of digits can be employed as a subroutine in the program for calculating the results of permutation and combination operations with a considerable savings in memory space within read only memory 202. Because memory space within read only memory 202 is generally restricted depending upon the type of integrated circuit employed, this memory space savings is an advantage. However, it should be understood by those skilled in the art that selection of other predetermined sets of digits within the displayed number for generation of the first and second operands is possible.

Entry of data for functions requiring integral operands in this manner serves to reduce the amount of memory space necessary to store and execute these functions. Data processing apparatuses of the type in which this invention is applicable typically employ an algebraic entry system such as disclosed in U.S. Pat. No. 4,208,720 issued June 17, 1980 to Harrison for "Calculator With Algebraic Operating System." Because it is shown that the two integral operands of these functions can be entered as a single number for display and calculation, and therefore these two operands may be stored in only one of working memories 206, this results in a savings of the number of working memories 206 available for storing other data. In addition this method of data entry of these functions is akin to the method of data entry for the trigonometric, logarithmic and exponential functions. Thus these two integral operand functions may occupy a state within the mathematical hierarchy similar to that occupied by the unitary operations such as the trigonometric, logarithmic and exponential functions. In the case of the calculation of permutations and the calculation of combinations described above, this is the preferred and mathematically correct hierarchical position for these functions. Thus when stored and operated upon in a manner such as described in the above cited U.S. Pat. No. 4,208,720, entry of these functions in the manner described in the present application results in a more nearly mathematically correct hierarchical system.

What is claimed is:

1. A data processing apparatus comprising:
    an operator input means including means for entering data digits and a decimal point and means for entering operational commands, said operational commands including at least one binary operational command corresponding to a binary operation mathematically defined only for first and second integral operands;
    an indicator memory means for storing data, consisting of a plurality of data digits and a decimal point, therein;
    an indicator means for generating an operator perceivable indication of said data stored in said indicator memory; and
    an arithmetic means, responsive to said input means and connected to said indicator memory, for storing entered data digits and an entered decimal point in said indicator memory, for performing entered operational commands on entered data and storing the result in said indicator memory and for performing said at least one binary operation requiring first and second integral operands upon entry of said at least one binary operational command and storing the result in said indicator memory, a first set of said data digits stored in said indicator memory, a first set of said data digits stored in said indicator memory being said first operand and a second set of said data digits stored in said indicator memory being said second operand.

2. A data processing apparatus as claimed in claim 1, wherein:
    said first set of said data digits consists of a predetermined integral number of the least significant whole number digits; and
    said second set of said data digits consists of said predetermined integral number of the most significant fractional digits.

3. A data processing apparatus as claimed in claim 2, wherein said predetermined integral number is 3.

4. A data processing apparatus as claimed in claim 1, wherein:
    said at least one binary operational command includes the operation of calculating the number of combinations of n things taken r at a time.

5. A data processing apparatus as claimed in claim 1, wherein:

said at least one binary operational command includes the operation of calculating the number of permutations of n things taken r at a time.

6. A data processing apparatus as claimed in claim 1, wherein:

said operational commands further include unitary operational commands, binary operational commands, a left-hand parenthesis command and a right-hand parenthesis command; and said arithmetic means includes hierarchy means for performing entered operational commands on entered data in accordance with a fixed heirarchy of operations associated with said entered operational commands as modified by entered left-hand parenthesis commands and entered right-hand parenthesis commands, said hierarchy means performing said binary operational commands corresponding to a binary operation integral operands with a fixed hierarchy of operation equal to said fixed hierarchy of operation associated with at least one of said unitary operational commands.

* * * * *